March 29, 1960 M. A. CAMPBELL 2,930,473
HOPPER FED MACHINE FOR ORIENTING WORK PIECES
Filed Feb. 7, 1957 5 Sheets-Sheet 1

INVENTOR.
MILFORD A. CAMPBELL
BY
ATTORNEY

March 29, 1960   M. A. CAMPBELL   2,930,473
HOPPER FED MACHINE FOR ORIENTING WORK PIECES
Filed Feb. 7, 1957   5 Sheets-Sheet 2

INVENTOR.
MILFORD A. CAMPBELL
BY
J. S. Murray
ATTORNEY

INVENTOR.
MILFORD A. CAMPBELL

March 29, 1960　　　M. A. CAMPBELL　　　2,930,473
HOPPER FED MACHINE FOR ORIENTING WORK PIECES
Filed Feb. 7, 1957　　　　　　　　　　　　5 Sheets-Sheet 4
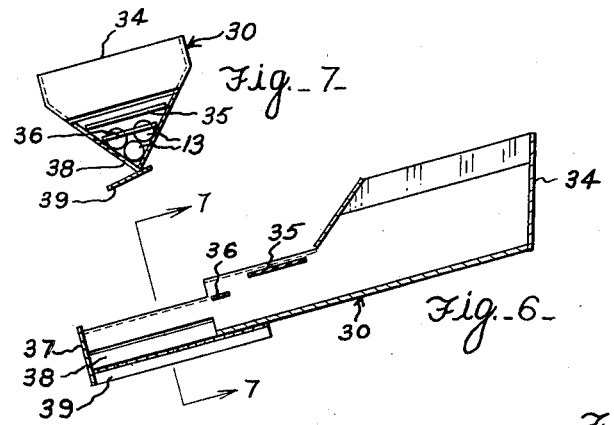
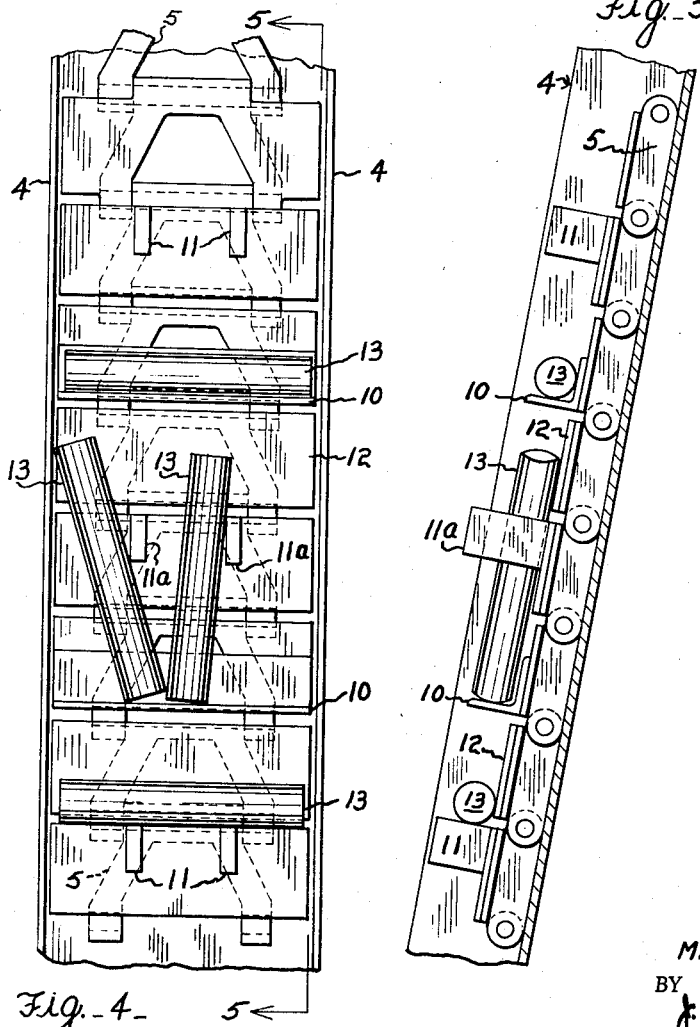
INVENTOR.
MILFORD A. CAMPBELL
BY
J. S. Murray
ATTORNEY March 29, 1960 M. A. CAMPBELL 2,930,473
HOPPER FED MACHINE FOR ORIENTING WORK PIECES
Filed Feb. 7, 1957 5 Sheets-Sheet 5
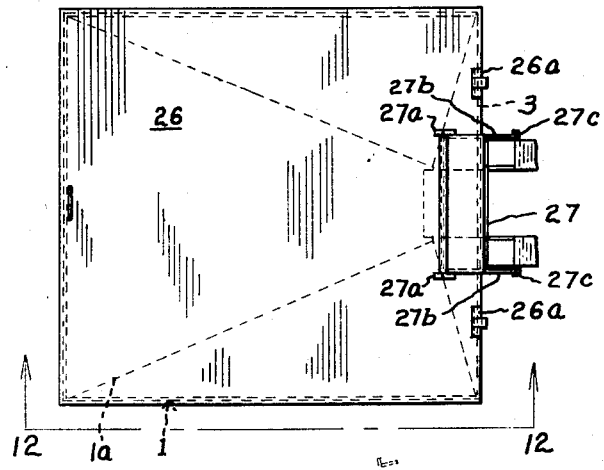
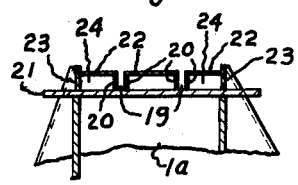
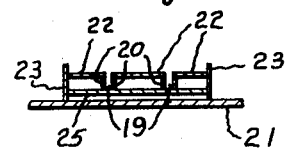
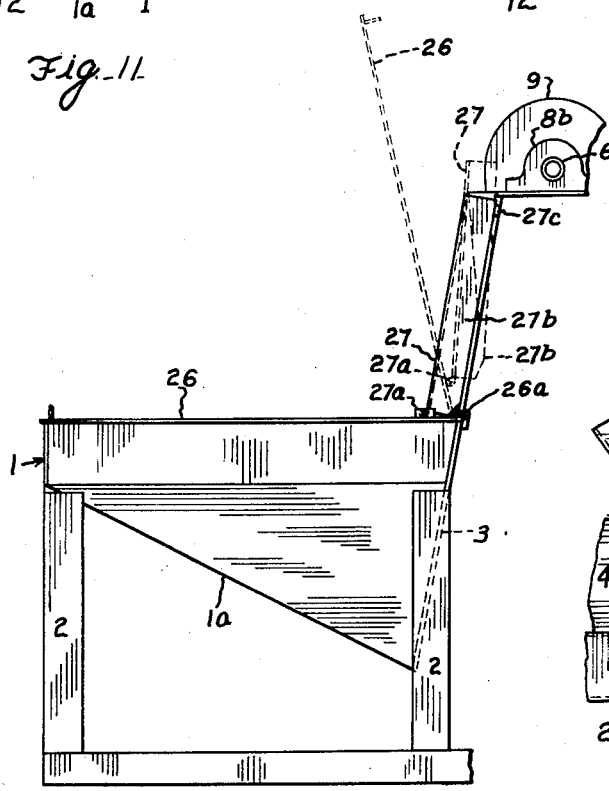
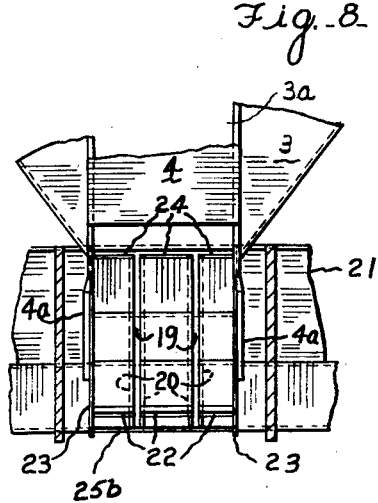
INVENTOR.
MILFORD A. CAMPBELL
BY
J. S. Murray
ATTORNEY United States Patent Office 2,930,473
Patented Mar. 29, 1960

2,930,473

HOPPER FED MACHINE FOR ORIENTING WORK PIECES

Milford A. Campbell, Detroit, Mich.

Application February 7, 1957, Serial No. 638,805

7 Claims. (Cl. 198—30)

This invention relates to a mechanism for progressively delivering elongated work-pieces from a hopper and for orienting such pieces in parallelism, as delivered.

An object is to adapt a conveyor to upwardly deliver elongated work-pieces from a hopper, and to equip the conveyor with such pick-up devices as will assure a substantially constant rate of such delivery.

Another object is to form a wall of the hopper with a slot substantially closed by an upwardly traveling span of said conveyor and affording access of the hopper contents to said pick-up devices.

Another object is to progressively deliver elongated work-pieces to one end portion of an elongated trough, downwardly inclined toward its other end and having a V form transverse to its length, tending to establish the pieces in parallelism as they travel down the trough.

Another object is to subject the trough to a continuous vibration to aid in establishing parallelism of the pieces and inducing their travel down the trough incline.

Another object is to resiliently support the trough so that it may adequately undergo the desired vibration.

Another object is to provide an abutment in said trough, so limiting travel of the pieces to an outlet at the lower trough end as to discharge them singly through such outlet.

These and various other objects are attained by the construction hereinafter described and illustrated in the accompanying drawings, wherein:

Fig. 4 is a fragmentary elevational view of a portion of the upwardly traveling span of the conveyor, showing various lodgments of work-pieces on the pick-up devices, and showing a channel member which guides the conveyor.

Fig. 5 is a vertical sectional view of the same, taken on the line 5—5 of Fig. 4.

Fig. 6 is a longitudinal axial sectional elevation of the orienting trough, taken on the line 6—6 of Fig. 2.

Fig. 7 is a cross section of the trough, as indicated by the line 7—7 of Fig. 6.

Fig. 8 is a fragmentary sectional view on the line 8—8 of Fig. 2 showing a provision beneath the hopper to prevent jamming of the machine by work pieces falling from the hopper.

Fig. 9 is a fragmentary sectional view on the line 9—9 of Fig. 2, further illustrating said provision.

Fig. 10 is a fragmentary sectional view on the line 10—10 of Fig. 2 still further illustrating said provision.

Fig. 11 is a partial plan view on a reduced scale, showing a lid surmounting said hopper and a cover enclosing said conveyor.

Fig. 12 is a side elevation of the same taken on the line 12—12 of Fig. 11.

Figure 1:
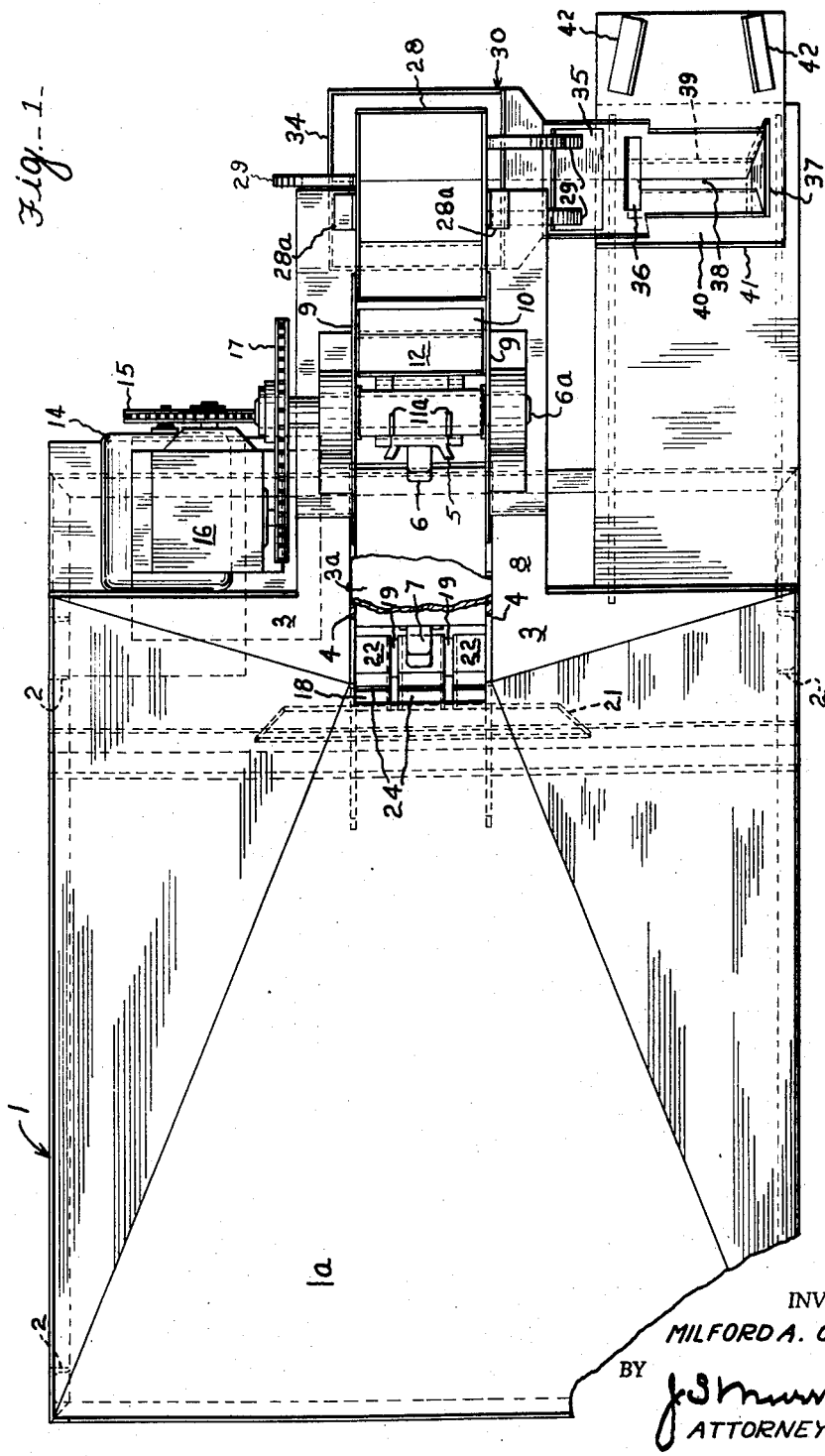
Fig. 1 is a top plan view of the machine and associated orienting device, omitting the uptraveling span of the conveyor.

In these views, the reference character 1 designates a hopper surmounting legs 2 and having its bottom 1a downwardly inclined toward a rear wall 3. Such wall is centrally slotted from top to bottom thereof, its slot 3a opening into an elongated channel member 4 affixed to said wall and thus forming an upwardly elongated rearward extension of the hopper. Within such extension is housed the upwardly traveling span of an elongated endless conveyor including a flexible chain 5. Such chain is mounted on upper and lower sprocket wheels 6 and 7 fixed on shafts 6a and 7a. The uppermost of said wheels is sufficiently elevated above the hopper to afford a required lift of the pieces to be conveyed. The lower wheel is in suitable rearward proximity to the hopper bottom. An upward extension 8 of the hopper wall 3 is slotted to upwardly continue the slot 3a and the channel member 4 has an upper portion maintaining the described relation to said slot. Said extension 8 forms part of a pedestal 8a surmounted by bearings 8b for the shaft 6a. Further surmounting the pedestal 8a are a pair of spaced substantially semicircular plates 9 between which the conveyor travels rearwardly over the upper sprocket wheel. It is preferred to so offset the upper wheel rearwardly from the lower one as to afford the conveyor a moderate rearward incline, as about ten degrees, in extending upwardly, the hopper wall 3 conforming to such incline.

The conveyor further comprises a series of pick-up devices secured to the outer face of the chain 5. Each such device incorporates three links of the chain and includes a shelf 10 having a slight clearance at its ends from the member 4, a pair of horizontally spaced lugs 11 spaced from said shelf in the direction of conveyor travel, and a plate 12 adjoining and preceding said lugs in said direction of travel. The distance between the shelves 10 of adjoining pickup devices preferably somewhat exceeds the length of the work-pieces 13 to be conveyed. The distance between the flanges of the channel member 4 is slightly greater than the work-piece length, and the spacing of the paired lugs 11 from each other and from the flanges 4 permits lodging of a workpiece in any of such spaces, and affords a material inclination of the pieces so lodged. Also, pieces may lodge in a transverse relation to conveyor travel on any of the shelves 10 or on any pair of the lugs 11, the various described lodgements being all illustrated in Figs. 4 and 5. This adaptation of the pick-up devices to variously receive the pieces achieves a much steadier and more reliable feed than can be established by devices lacking such diversity of lodgement. Efficiency of the described devices is such that they will continue to steadily withdraw pieces from the hopper until the latter is completely empty. It has been found that an increased efficiency results from employing relatively long paired lugs 11a at uniformly spaced points along the conveyor, as for example as elements of every fourth or fifth pick-up device. These extra long lugs loosen up the hopper contents confronted by the conveyor and thus avoid such packing of the work-pieces as might otherwise hold them clear of the conveyor.

Beneath said semi-circular plates 9, a pair of triangular plates 9a rigidly flank the channel member. The forward edges 9b of the latter plates are so inclined as to engage and dislodge any work pieces that may project angularly from the pickup devices beyond the margins of said channel member.

While the conveyor may be variously driven, it is preferred to install an electric motor 14 at the rear of the machine, and a speed-reducing drive from such motor to the shaft 6a through a chain 15, gears housed at 16, and another chain 17.

To afford upward passage for the longer lugs 11a it is necessary to form an opening 18 in the hopper bottom confronting the channel 4, such opening being elongated transversely to the direction of conveyor travel. A housing is disposed beneath and partially obstructs said opening leaving only spaced channels 19 through which said lugs may travel as best shown in Figs. 8, 9 and 10.

Such channels are formed by ribs 20 rigidly affixed to a supporting member 21 for the hopper. Except for said channels, the ribs are bridged by plates 22, which are in part supported by vertical side members 23 of said housing. The latter are fixed, as by welding, to said supporting member 21 for the hopper and to downward, mutually oppositely offset extensions 4a of said channel member 4. Said ribs upwardly terminate immediately beneath the opening 18 and are surmounted by plates 24.

The side members 23 support three plates 25, 25a and 25b, disposed parallel to the axis of the lower sprocket wheel 7 and arranged end to end in an approximate arc centered at such axis. Said plates carry extensions of the channels 19 to a point substantially beneath said sprocket wheel 7, so that when one shelf member 10 is traveling upwardly from the opening 33, the next shelf has moved into position between the side member 23 and within the arcuate extent of said channels 19. Thus, while a work-piece may fall into the housing between said arcuate surface and the conveyor chain after a shelf 10 emerges therefrom, the descent of such work-piece is confined within the housing so that it must be encountered by the next shelf and carried upwardly, thus preventing jamming of the machine. It will be apparent that the plates 22 and the rib-surmounting plates 24 prevent workpieces from lodging between the ribs 20.

For the safety of operators, and to prevent foreign objects from falling or being thrown into the hopper and conveyor, as the latter travels upwardly, it is preferred to provide a lid 26 (Figs. 11 and 12) for the hopper, pivoted thereon at 26a. The lid itself mounts pivot elements 27a for a cover 27 enclosing the channel member 4. Such cover has marginal flanges 27b which rest upon ears 27c projecting from the upper extension 8 of the rear wall 3 of the hopper.

The pivot elements 27a are so disposed on said lid, that when it is raised, the channel cover 27 may rise conformingly as shown in dash lines in Fig. 11. The details of the machine have been omitted in Figs. 11 and 12, as they are intended only to illustrate the lid 26 and cover 27.

Figure 2:
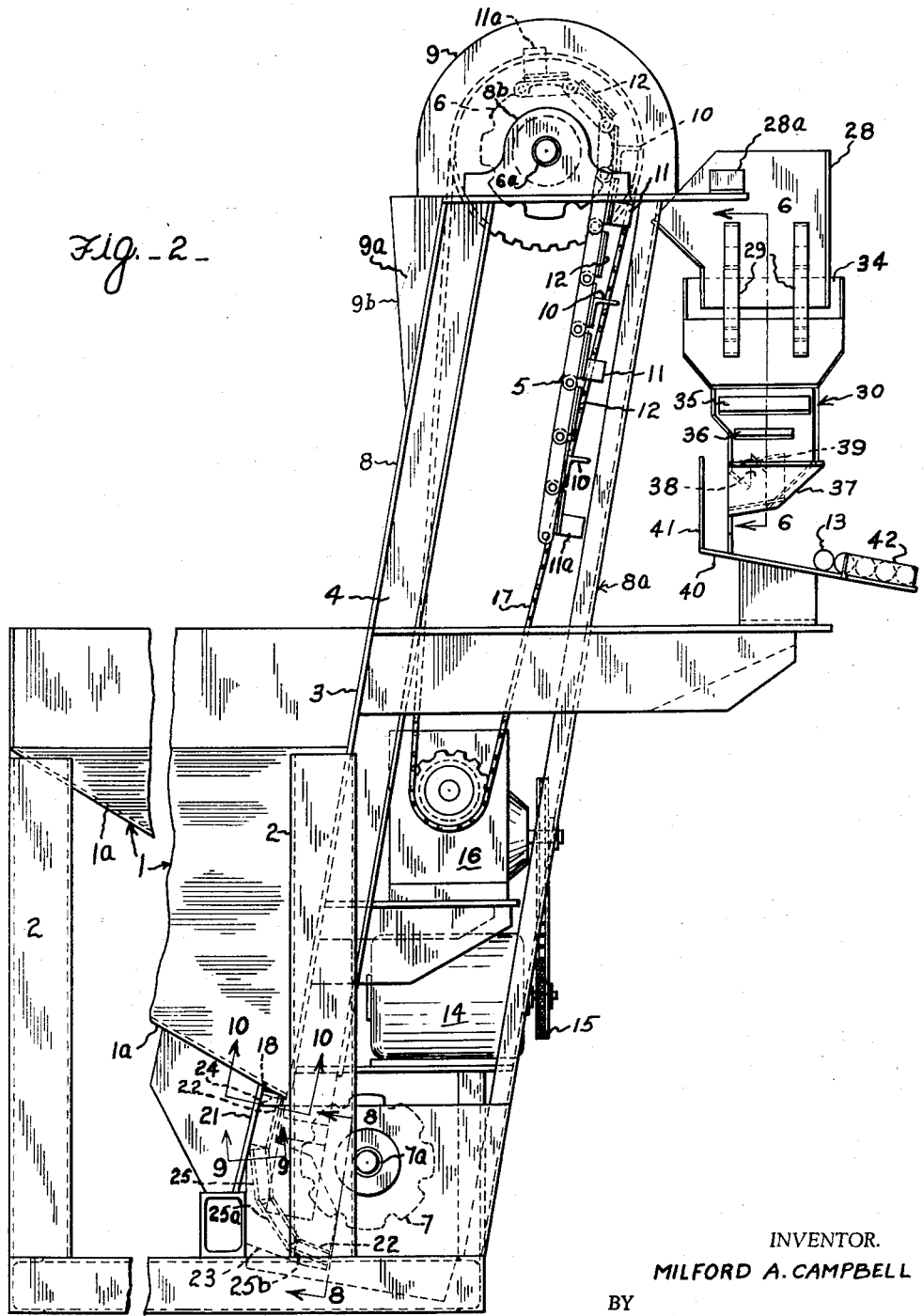
Fig. 2 is a view of the same in side elevation.
Figure 3:
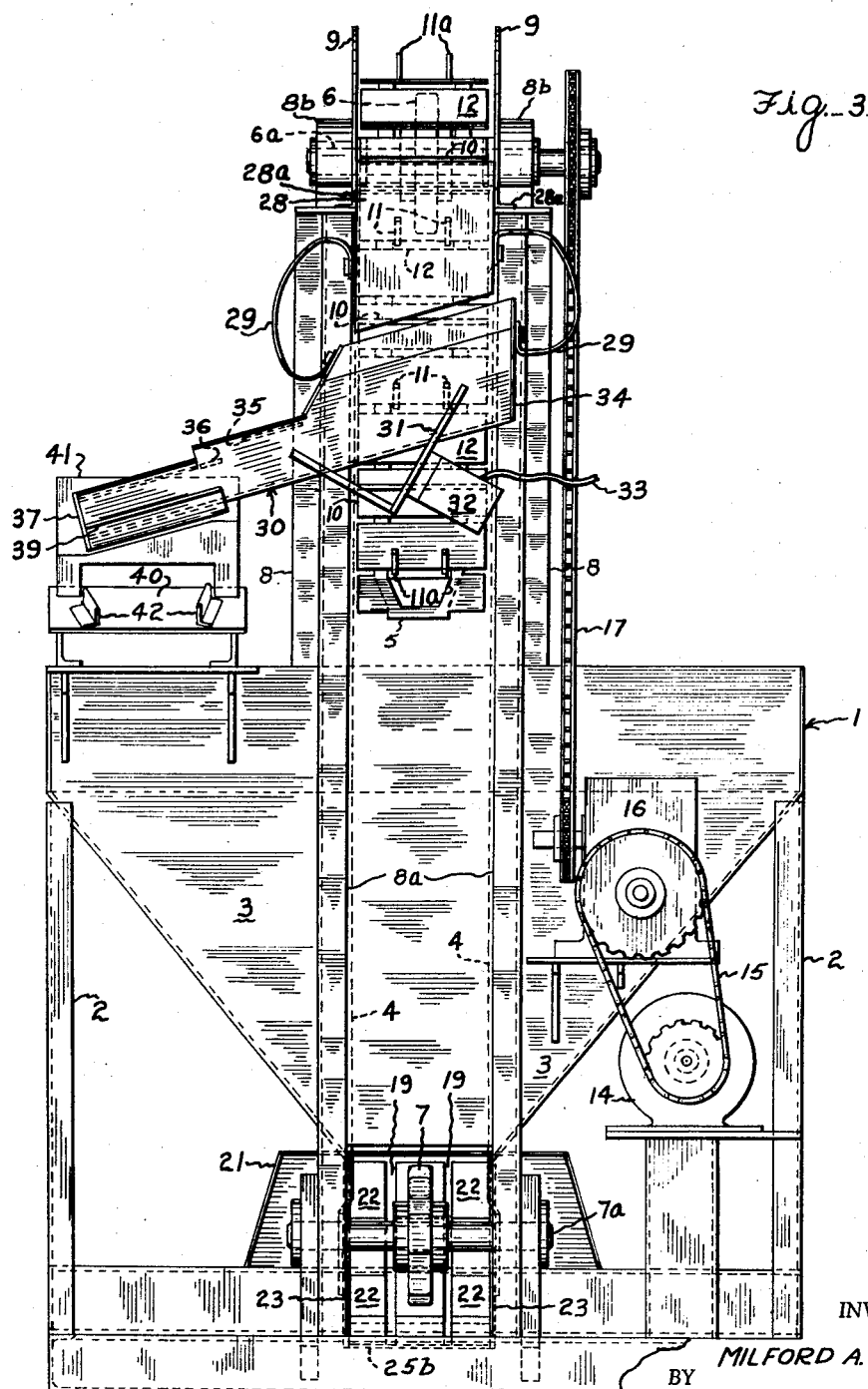
Fig. 3 is a rear view of the same.

From the upper end of the conveyor, the work-pieces discharge rearwardly, due to inversion of the pick-up devices. In rearward proximity to the upper end of the descending conveyor span, there is installed a chute 28, open at top and bottom and having its top portion forwardly extended to closely approach the conveyor, as best appears in Fig. 2. Said chute is suitably rigidly supported, as by brackets 28a fixed upon the pedestal 8a, and its lower end is laterally inclined, preferably at about twenty degrees to the horizontal. Supported upon and below the chute by a pair of bowed strap springs 29 is a laterally elongated trough 30, inclined longitudinally to conform to the inclined outlet end of the chute. The upper or receiving end portion of the trough is in the approximate plane of the lower part of the chute but so exceeds the chute in area as to afford ample clearance between such parts. Attached to and beneath the trough by a V-shaped bracket 31 is a vibrator 32 (Fig. 3) of any known type, the illustrated vibrator being of a compressed air type and having an air delivery duct 33. The vibrator takes effect in a direction having substantially equal components one vertical and the other conforming to the inclination of the trough, this being most effective in inducing travel of the pieces down such inclination. The trough is substantially V-shaped in cross-section, and consequently the pieces dropping therein tend to conform to the trough incline and to travel down such incline. A wall 34 serves to close the trough at its upper end.

The trough has a considerable portion extending downward and laterally beyond its inlet end portion, the vertical extent of such portion being preferably reduced, while its apex remains constant. Extending across and within said reduced portion, are two spaced stops 35 and 36 for successively limiting stacking of the pieces sliding down the incline. The stop 35 first taking effect is so spaced above the trough apex as to allow no more than three pieces to advance in stacked relation. The subsequently effective stop 36 has a lesser spacing from the apex such as to allow passage of only one piece at a time. Thus as the pieces successively encounter an abutment formed by a wall 37 closing the lower or discharge end of the trough, they rest at the trough apex and are hence aligned and parallel.

Laterally opening in one of the V walls of the trough and extending from the end wall 37 just above the trough apex, is a slot 38 proportioned to afford a successive discharge of the pieces in a direction transverse to their length. From the lower edge of such slot, there is forwardly extended at a slight downward inclination a plate 39 which also conforms to the trough inclination. Thus, as each piece encounters the end wall 37 and thus registers with the slot 38, it is induced by the lateral inclination of said plate and by vibration imposed on the entire orienting device to travel through said slot and to the lower edge of said plate. The end wall 37 has an extension conforming to and rising from said plate preventing any sliding of the pieces along their major axes as they roll down the transverse incline of the plate. Downwardly spaced from the plate 39 is the upper end portion of a platform 40 on which the pieces drop upon rolling clear of the plate 39 such platform having an inclination reverse to that of the plate and being adequately elongated to carry an accumulation of the pieces, as for example ten. A wall 41, fixed on the upper end of the platform, is so spaced from the discharge edge of the plate 39 as to guide the pieces in falling to said end.

The lower end portion of the platform marginally carries a pair of angle bars 42, converging slightly toward the discharge end of the platform, their upper ends being spaced to somewhat exceed the length of the pieces, and their lower ends barely affording a passage for the pieces. Such bars serve to correct any slight relative staggering of the pieces as they roll down the platform, assuring that their discharge relation to the latter will be substantially a constant.

While disposal of the pieces after discharge from the platform 30 does not concern the present invention they may be delivered by any convenient means to a mechanism (not shown) for incorporating them in an assembly or subjecting them to any desired operation.

By locating the conveyor as described and shown in exterior proximity to a wall of the hopper, there is avoided any reduction by the conveyor of the hopper capacity, and the resistance offered by the hopper contents to conveyor travel is minimized.

It will be appreciated that there may be considerable variation in the particular form of the pieces handled by the described machine, the main requisites being an elongation of such pieces and their substantial uniformity.

The rate of delivery of the oriented pieces from the machine is for most purposes preferably substantially constant. However, the trough 30 has in its upper end portion a considerable capacity and some variation of the final delivery rate may be had by using more or less of such capacity.

What I claim is:

1. A mechanism for orienting elongated substantially identical work-pieces in parallelism, such mechanism comprising a substantially V-shaped trough having a downward inclination from an upper to a lower end thereof and having its upper portion formed with an opening for delivery of work-pieces to the trough, the lower portion of the trough being formed laterally with an outlet elongated in the direction of downward inclination of the trough and proportioned to laterally and singly deliver pieces from the trough, an abutment at the lower end of the trough for establishing a position of registration of the pieces singly with said outlet, and means in the trough limiting delivery of the pieces to said position to one at a time.

2. A mechanism for orienting elongated substantially identical work-pieces in parallelism, such mechanism comprising an elongated substantially V-shaped trough having receiving and discharge ends and having an abutment at its discharge end, means for continuously delivering said work-pieces to said receiving end, means for vibrating the trough to feed the pieces to said discharge end, and a stop fixed upon and within the trough between said ends and spaced upwardly from the trough bottom to limit feeding of the pieces to one at a time, the trough being laterally formed with a discharge slot elongated longitudinally of the trough and extending substantially from said abutment to discharge the pieces singly and laterally from the trough, said abutment and stop being vibratory in unison with the trough.

3. In a mechanism as described in claim 2, a chute disposed about the receiving end of the trough and directing the pieces to such end from said delivering means, and means for resiliently supporting the trough and thus affording a response of the trough to said vibrating means.

4. In a mechanism as described in claim 2, a chute disposed above the receiving end of the trough and directing the pieces to such end from said delivery means, and means for resiliently mounting the trough on the chute and thus affording a response of the trough to said vibrating means.

5. In a mechanism as described in claim 2, another stop fixed upon and within and extending across the trough to encounter the pieces in advance of the first mentioned stop and predeterminedly limit the pieces concurrently encountering the first mentioned stop.

6. In a mechanism as described in claim 2, a plate fixed on said trough below said slot and receiving the pieces successively discharged from the slot, such plate being inclined transversely to the trough.

7. In a mechanism as described in claim 6, a platform downwardly spaced from the discharge end portion of the trough and inclined reversely to the inclination of said plate, and a substantially vertical plate upwardly extending from the upper end of said platform and confronting said slot and spaced from the trough to provide a passage for downward delivery of the pieces singly to the platform.

References Cited in the file of this patent

UNITED STATES PATENTS

| | | |
|---|---|---|
| 882,795 | Paul | Mar. 24, 1908 |
| 2,109,703 | Maiers | Mar. 1, 1938 |
| 2,159,050 | Quamma | May 23, 1939 |
| 2,581,720 | Schulte | Jan. 8, 1952 |
| 2,587,740 | Laughlin | Mar. 4, 1952 |
| 2,609,912 | Engel | Sept. 9, 1952 |
| 2,701,637 | Rundt | Feb. 8, 1955 |
| 2,776,034 | Jordt | Jan. 1, 1957 |